(12) United States Patent
Keirouz et al.

(10) Patent No.: US 7,400,638 B2
(45) Date of Patent: Jul. 15, 2008

(54) APPARATUS AND METHODS FOR MANAGING PACKETS IN A BROADBAND DATA STREAM

(75) Inventors: Joe Keirouz, Fremont, CA (US); Simeon Ngo Sy, San Jose, CA (US); Robert Edward Liston, Menlo Park, CA (US)

(73) Assignee: Tellabs San Jose, Inc., San Jose, CA (US)

( * ) Notice: Subject to any disclaimer, the term of this patent is extended or adjusted under 35 U.S.C. 154(b) by 820 days.

(21) Appl. No.: 10/828,380

(22) Filed: Apr. 20, 2004

(65) Prior Publication Data

US 2004/0196789 A1  Oct. 7, 2004

Related U.S. Application Data

(63) Continuation of application No. 09/737,916, filed on Dec. 15, 2000, now Pat. No. 6,741,562.

(51) Int. Cl.
*H04L 12/56* (2006.01)

(52) U.S. Cl. ..................................... 370/412

(58) Field of Classification Search ............... 370/230, 370/351, 389, 395.1, 395.4, 395.52, 395.7, 370/412, 413, 415, 465, 470–474
See application file for complete search history.

(56) References Cited

U.S. PATENT DOCUMENTS

| | | | |
|---|---|---|---|
| 5,144,622 A | | 9/1992 | Takiyasu et al. |
| 5,303,236 A | | 4/1994 | Kunimoto et al. |
| 5,671,224 A | * | 9/1997 | Pyhalammi et al. ......... 370/401 |
| 5,841,772 A | * | 11/1998 | Daniel et al. ............. 370/395.4 |
| 6,118,759 A | | 9/2000 | Ohyoshi et al. |
| 6,249,528 B1 | * | 6/2001 | Kothary ..................... 370/466 |
| 6,266,325 B1 | | 7/2001 | Ishioka et al. |
| 6,275,472 B1 | | 8/2001 | Yamaguchi et al. |
| 6,493,347 B2 | * | 12/2002 | Sindhu et al. ............... 370/401 |
| 6,975,651 B1 | * | 12/2005 | Ono et al. ................... 370/474 |
| 7,061,865 B2 | * | 6/2006 | Magill et al. ............... 370/235 |
| 2004/0202169 A1 | * | 10/2004 | Mukouyama et al. .... 370/395.1 |

OTHER PUBLICATIONS

U.S. Appl. No. 09/661,244, filed Sep. 13, 2000; "Apparatus and Methods for Processing Packets in a Broadband Stream"; Inventors: Rob Liston, et al.

(Continued)

*Primary Examiner*—Hassan Kizou
*Assistant Examiner*—Betty Lee
(74) *Attorney, Agent, or Firm*—Baker Botts L.L.P.

(57) ABSTRACT

An exemplary method for writing packets in a data stream comprises the steps of dividing a packet into long packet cells and short packet cells, storing the long packet cells in a set of long cell queues and the short packet cells in a set of short cell queues, selectively pairing a long packet cell in one of the set of long cell queues with a short packet cell in one of the set of short cell queues to obtain an optimized pair of packet cells at each write cycle, and sequentially writing the optimized pair of packet cells at each write cycle to a set of memory banks. An exemplary method for reading packets in a data stream comprises the steps of receiving long cell requests and short cell requests, storing the long cell requests in a set of long cell request queues, storing the short cell requests in a set of short cell request queues, selectively pairing a long cell request in one of the set of long cell request queues and a short cell request in one of the set of short cell request queues to obtain an optimized pair of cell requests at each read cycle, retrieving packet cells corresponding to the optimized pair of cell requests from a set of memory banks at each read cycle, reordering the packet cells in a first data buffer, and sending the packet cells in a sequential order.

20 Claims, 3 Drawing Sheets

OTHER PUBLICATIONS

U.S. Appl. No. 09/737,917, filed Dec. 15, 2000; "Apparatus and Method for Scheduling Packets in a Broadband Data Stream"; Inventors: Glenn Gracon, et al.

U.S. Appl. No. 09/803,090, filed Mar. 8, 2001; "Apparatus and Method for Establishing Virtual Private Networks in a Broadband Network"; Inventors: Michael Kazban, et al.

* cited by examiner

APPARATUS AND METHODS FOR MANAGING PACKETS IN A BROADBAND DATA STREAM

CROSS REFERENCE TO RELATED APPLICATIONS

This application is a continuation of U.S. application Ser. No. 09/737,916 filed Dec. 15, 2000 now U.S. Pat. No. 6,741,562, entitled "Apparatus and Methods for Managing Packets in a Broadband Data Stream" which relates to an application entitled "Apparatus and Methods for Scheduling Packets in a Broadband Data Stream" filed on Dec. 15, 2000 bearing Ser. No. 09/737,917, an application entitled "Apparatus and Methods for Processing Packets in a Broadband Data Stream" filed on Sep. 13, 2000 bearing Ser. No. 09/661,244, and an application entitled "Apparatus and Methods for Establishing Virtual Private Networks in a Broadband Network" filed on Mar. 8, 2001 bearing Ser. No. 09/803,090. These related applications are hereby incorporated by reference for all purposes.

TECHNICAL FIELD OF THE INVENTION

This invention relates to apparatus and methods for managing packets in a data stream. In particular, this invention relates to apparatus and methods for managing packets in a broadband data stream.

BACKGROUND OF THE INVENTION

As the Internet evolves into a worldwide commercial data network for electronic commerce and managed public data services, increasingly, customer demands have focused on the need for advanced Internet Protocol (IP) services to enhance content hosting, broadcast video and application outsourcing. To remain competitive, network operators and Internet service providers (ISPs) must resolve two main issues: meeting continually increasing backbone traffic demands and providing a suitable Quality of Service (QoS) for that traffic. Currently, many ISPs have implemented various virtual path techniques to meet the new challenges. Generally, the existing virtual path techniques require a collection of physical overlay networks and equipment. The most common existing virtual path techniques are: optical transport, asynchronous transfer mode (ATM)/frame relay (FR) switched layer, and narrowband Internet Protocol virtual private networks (IP VPN).

The optical transport technique is the most widely used virtual path technique. Under this technique, an ISP uses point-to-point broadband bit pipes to custom design a point-to-point circuit or network per customer. Thus, this technique requires the ISP to create a new circuit or network whenever a new customer is added. Once a circuit or network for a customer is created, the available bandwidth for that circuit or network remains static.

The ATM/FR switched layer technique provides QoS and traffic engineering via point-to-point virtual circuits. Thus, this technique does not require the creation of dedicated physical circuits or networks, as is the case with the optical transport technique. Although this technique is an improvement over the optical transport technique, this technique has several drawbacks. One major drawback of the ATM/FR technique is that this type of network is not scalable. In addition, the ATM/FR technique also requires that a virtual circuit be established every time a request to send data is received from a customer.

The narrowband IP VPN technique uses best effort delivery and encrypted tunnels to provide secured paths to the customers. One major drawback of a best effort delivery is the lack of guarantees that a packet will be delivered at all. Thus, this is not a good candidate when transmitting critical data.

Thus, it is desirable to provide apparatus and methods that reduce operating costs for service providers by collapsing multiple overlay networks into a multi-service IP backbone. In particular, it is desirable to provide apparatus and methods that allow an ISP to build the network once and sell such network multiple times to multiple customers. It is further desirable to provide apparatus and methods that efficiently manage packets in a broadband data stream.

SUMMARY OF THE INVENTION

An exemplary method for writing packets in a data stream comprises the steps of dividing a packet into long packet cells and short packet cells, storing the long packet cells in a set of long cell queues and the short packet cells in a set of short cell queues, selectively pairing a long packet cell in one of the set of long cell queues with a short packet cell in one of the set of short cell queues to obtain an optimized pair of packet cells at each write cycle, and sequentially writing the optimized pair of packet cells at each write cycle to a set of memory banks.

In one embodiment, the exemplary method for writing packets further comprises the steps of determining the data capacity of a last packet cell of the packet, assigning a first tag to the last packet cell if the data capacity is full, and assigning a second tag to the last packet cell if the data capacity is not full. The first or second tag is used for reorganizing the packet during a read cycle.

In another embodiment, the exemplary method for writing packets further comprises the steps of monitoring the long cell queues and the short cell queues and writing a stale packet cell out of order after the stale packet cell remains in a respective cell queue for a predetermined amount of time. In one embodiment, a cell index is maintained. An index difference between a top long packet cell and a top short packet cell is calculated based on the cell index and a packet stale cell is determined based on the index difference.

An exemplary method for reading packets in a data stream comprises the steps of receiving long cell requests and short cell requests, storing the long cell requests in a set of long cell request queues, storing the short cell requests in a set of short cell request queues, selectively pairing a long cell request in one of the set of long cell request queues and a short cell request in one of the set of short cell request queues to obtain an optimized pair of cell requests at each read cycle, retrieving packet cells corresponding to the optimized pair of cell requests from a set of memory banks at each read cycle, reordering the packet cells in a first data buffer, and sending the packet cells in a sequential order.

In a first embodiment, the reordering step includes the steps of assigning a tag number to each cell request, the tag number associating the cell request to a long cell request queue or a short cell request queue, and reordering the packet cells based on the tag number. In a second embodiment, the reordering step includes the steps of storing the packet cells in the first data buffer and organizing the packet cells in a sequential order in the first data buffer. In this embodiment, the organizing step includes the step of using a tag number index to reorder the packet cells in the sequential order.

In one embodiment, the exemplary method for reading packets further comprises the steps of organizing multiple packets comprising packet cells in a second data buffer and sending the multiple packets as a frame. In another embodiment, the multiple packets include packets of a first size and packets of a second size and the packets of a second size are organized and sent as a frame.

In another embodiment, the exemplary method for reading packets further comprises the steps of monitoring the long cell request queues and the short cell request queues and retrieving a packet cell corresponding to a stale cell request out of order after the stale cell request remains in a respective long cell request queue or short cell request queue for a predetermined amount of time. In one embodiment, a cell request index is maintained. An index difference between a top long cell request and a top short cell request is calculated based on the cell request index and a stale cell request is determined based on the index difference.

An exemplary apparatus for managing packets in a data stream comprises a set of buffers, each of the buffers including a long cell queue and a short cell queue, a memory access control circuit, a write request control circuit, and a read request control circuit. The write request control circuit divides a received packet into packet cells, stores each packet cell into a long cell queue or a short cell queue in the buffers, and pairs a long cell with a short cell during a write cycle. The read request control circuit receives long cell requests and short cell requests, stores each long cell request in a long cell queue and each short cell request in a short cell queue in the buffers, and pairs a long cell request with a short cell request during a read cycle. The memory access control circuit writes the packet cells from the buffers sequentially into a memory during the write cycle and reads cell data from the memory during the read cycle. In one embodiment, the memory is a double data rate SDRAM divided into multiple banks.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which.

DETAILED DESCRIPTION OF THE INVENTION

Figure 1:
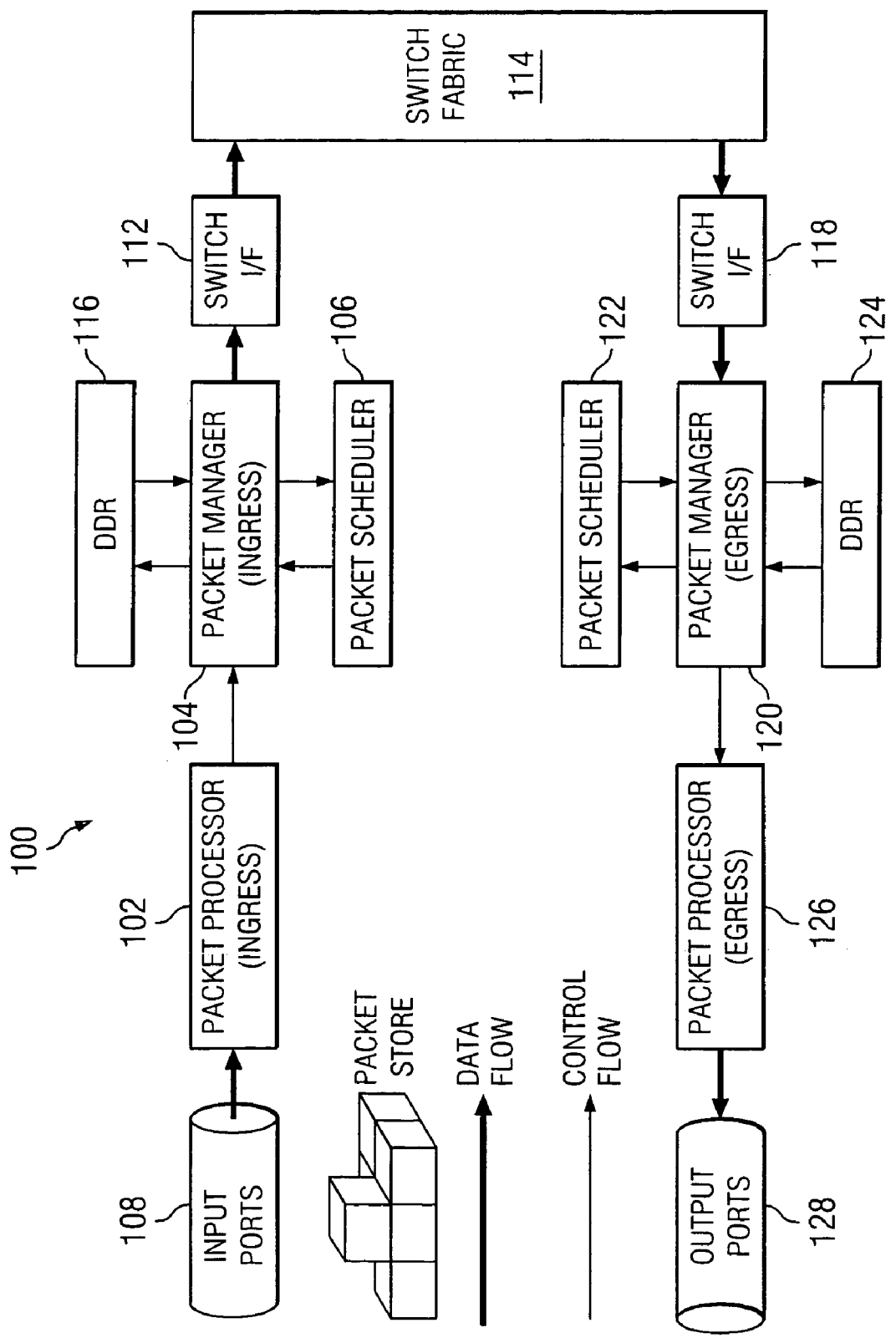
FIG. 1 schematically illustrates an exemplary traffic management system in accordance with an embodiment of the invention.

FIG. 1 schematically illustrates a traffic management system 100 for managing packet traffic in a network. In the ingress direction, the traffic management system 100 comprises a packet processor 102, a packet manager 104, a packet scheduler 106, a switch interface 112, and a switch fabric 114. The packet processor 102 receives packets from physical input ports 108 in the ingress direction.

In the ingress direction, the packet processor 102 receives incoming packets from the input ports 108 and, after some processing, stores the packets in a double data-rate memory (DDR) 116 managed by the packet manager 104. After a packet is stored in the DDR 116, a copy of the packet's identification information (or a packet identifier) is sent from the packet manager 104 to the packet scheduler 106 to be processed for traffic control. The packet scheduler 106 performs policing and congestion management processes on any received packet identifier. The packet scheduler 106 sends instructions to the packet manager 104 to either drop a packet due to congestion or send a packet according to a schedule. If a packet is to be sent, the packet identifier of that packet is shaped and queued by the packet scheduler 106. Typically, the packet scheduler 106 modifies a packet identifier to include a time slot designation. The packet scheduler 106 then sends the modified packet identifier to the packet manager 104. Upon receipt of a modified packet identifier, the packet manager 104 transmits the packet identified by the packet identifier to the switch interface 112 during the designated time slot to be sent out via the switch fabric 114.

In the egress direction, packets arrive through the switch fabric 114 and switch interface 118, and go through similar processes in a packet manager 120, a packet scheduler 122, a DDR 124, and a packet processor 126. Finally, egress packets exit the system through output ports 128. Operational differences between ingress and egress are configurable.

The packet processor 102 and the packet scheduler 106 are described in more detail in related applications as referenced above.

Figure 2:
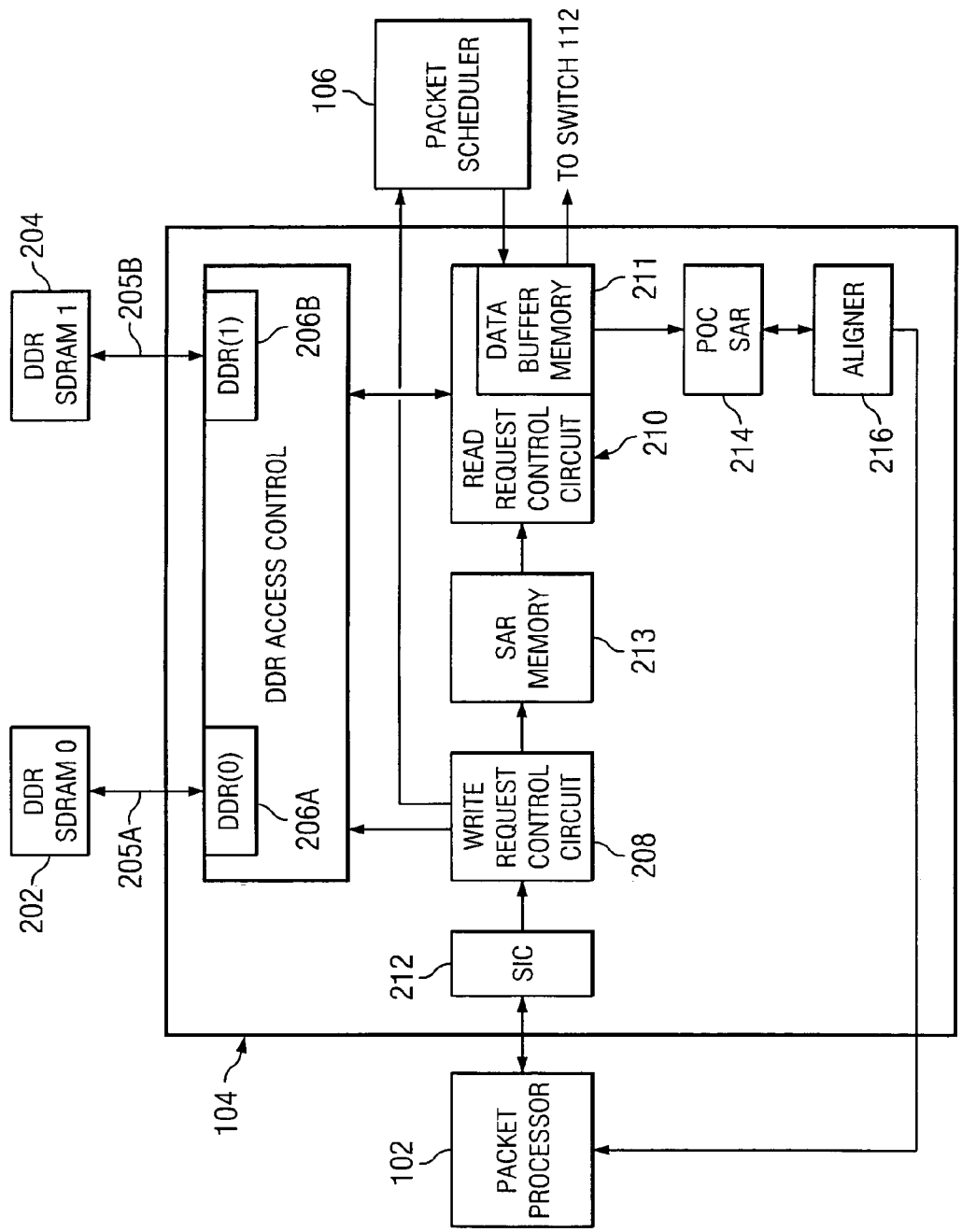
FIG. 2 schematically illustrates an exemplary packet manager in accordance with an embodiment of the invention.

FIG. 2 illustrates an exemplary packet manager 104 functionally connected to the packet processor 102 and the packet scheduler 106. The packet manager 104 includes a segmentation and reassembly (SAR) input control circuit (SIC) 212, a DDR(O) access control 206A, a DDR(I) access control 206B, a write request control circuit 208, a read request control circuit 210, a SAR memory 213, a packet over SONET interface output control SAR (POC SAR) 214, and an aligner 216. The read request control circuit 210 includes a data buffer memory 211 for reordering packet cells. The SAR memory 213 stores cell information and is normally used for ATM and FR applications.

The SIC 212 performs the process of dividing a packet into packet cells (i.e., segmentation) and the process of reassembling the packet cells into a packet (i.e., reassembly). The POC SAR 214 reads data cells from the DDR memory and performs a cell to packet and frame formatting. After formatting, the POC SAR 214 sends the formatted data to a proper output. In an exemplary embodiment, a DDR SDRAM O 202 and a DDR SDRAM I 204 are controlled by the DDR(O) access control 206A and the DDR(I) access control 206B via DDR transfer buses 205A and 205B, respectively. For ease of explanation, only operations in the DDR SDRAM O 202 and the DDR(O) access control 206A are described below. A person skilled in the art would recognize that the description below is similarly applicable to the DDR SDRAM I 202 and the DDR(I) access control 206B.

Figure 3:
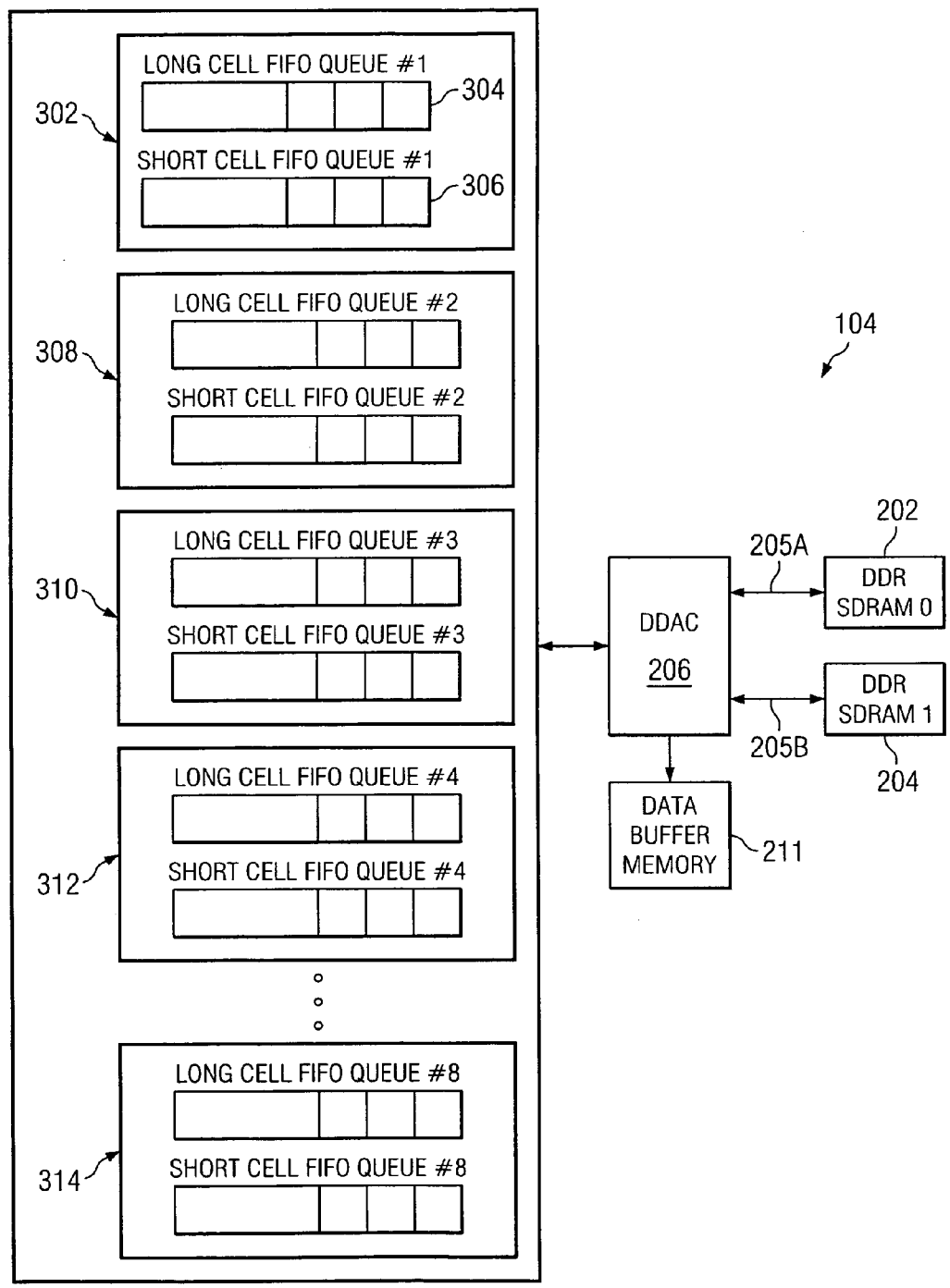
FIG. 3 schematically illustrates another exemplary packet manager in accordance with an embodiment of the invention.

In an exemplary embodiment, the DDR SDRAM O 202 is divided into four banks. A person skilled in the art would recognize that the number of banks per DDR SDRAM can vary to achieve any desired result. In this embodiment, the packet manager 104 maintains four FIFO buffers per DDR SDRAM O 202. Each FIFO buffer stores data to be written into a bank in the DDR SDRAM O 202 at the direction of the DDR(O) access control 206A. In an exemplary embodiment, each FIFO buffer includes a long cell queue and a short cell queue. As shown in FIG. 3, FIFO buffer #1 302 has a long cell queue 304 and a short cell queue 306. Similarly, other FIFO buffers (308-314) each has a long cell queue and short cell queue. In an exemplary embodiment, each long or short cell queue is divided into cells, each cell having a fixed size, such as 64 bytes.

During a write cycle, packets received by the packet manager 104 from the packet processor 102 are divided into multiples packet cells. In one embodiment, the write request control circuit 208 divides received packets into packet cells. Most of the data in the packet is divided into long cells and the short end (or leftover portion) of the packet is divided into short cell(s). In one embodiment, packet cells are stored into the FIFO buffers via pointers. In an exemplary embodiment, packet cells in the FIFO buffers are written into sequential banks in the DDR SDRAM O 202 by the DDR(O) access control 206A. For example, the first cell of a packet is written into the bank consecutive to the bank last used by a previous packet. In an exemplary embodiment, the write request control circuit 208 pairs up a best long and short cell combination during each write cycle to optimize performance (in an optimized performance order). In an exemplary embodiment, a cell index is kept for every long and short cell of each bank. In one embodiment, if an index difference between top long and short cells of the FIFO buffers has been exceeded, the optimized performance order is suspended and a service of any stale cells is performed. A cell becomes stale if the optimized performance order does not allow it to be serviced for a predetermined amount of time.

In an exemplary embodiment, if every packet cell buffered has the maximum size of 64 bytes, assuming a 64 bit wide DDR transfer bus running at 133 MHz, the peak bandwidth is approximately 17 Gb/s [64(Mbits/transfer) * 2 (transfers/clock) * 133 (cycles/μs)]. This peak bandwidth assumes that data transfer is achieved during every clock cycle. In another embodiment, an actual peak bandwidth is calculated by taking into consideration requirements of a DDR, such as refresh time (e.g., 75 ns/7.8 μs), cycle write data recovery when switching from write to read (e.g., 3 clocks), and data/data strobe turn around time when switching from read to write (1 clock). For example, a 64-byte cell data transfer (i.e., read or write) can use up to 4 clocks of a 64 bit DDR transfer bus. When taking into consideration the requirements of a DDR, the peak bandwidth operating at 8 cell read /8 cell write cycles is approximately 15.6 Gb/s.

The above embodiment assumes that each packet cell received is 64 bytes in size (i.e., maximum size). In the worst case scenario, when each packet cell received is 1 byte in size (i.e., minimum size), the peak bandwidth can be as low as approximately 0.26 Gb/s. In the presence of short cells, the DDR bandwidth can be optimized if 64 byte cells are mixed with 1 byte cells within a DDR write or read cycle, compared to a situation in which only 64 byte cells are serviced in one write or read cycle and only 1 byte cells are serviced in another write or read cycle. In exemplary write cycles, the write request control circuit 208 pairs up the best long and short cell combinations to achieve an optimized performance order.

A frame comprises a series of re-assembled packets. In an exemplary embodiment, packets received from the packet processor 102 that are destined to be reassembled as a frame are sent to the SIC 212. The SIC 212 maintains a port descriptor that is indexed by input connection identifiers (ICIDs). The SIC 212 reviews the last cell of a packet and sets a first tag (e.g., a FULL tag) if that cell contains 64 bytes of data; otherwise, the SIC 212 clears a default FULL tag, stores an actual cell size (in byte_count) in the last (64th) byte of the cell, and sets a second tag (e.g., a EOFRAG tag) indicating that the cell is the last cell of the packet. This information is stored in the internal memory 213 within the SIC 212.

During a read cycle, the packet manager 104 receives transmit cell requests from the packet scheduler 106. Transmit cell requests are stored in the FIFO buffers that store cell data during a write cycle. Similar to a write cycle, during a read cycle, four FIFO buffers each comprising a long-request queue and a short-request queue correspond to four banks in the DDR SDRAM O 202 and the length of requested data cells. Similarly, four FIFO buffers each comprising a long-request queue and a short-request queue correspond to four banks in the DDR SDRAM I 204 and the length of requested data cells. In an exemplary embodiment, transmit cell requests are processed by the read request control circuit 210, which combines short and long requests in an optimized performance order.

In one embodiment, a tag number for each request is assigned to every transmit cell request. Such tag number is stored in a request index (not shown). The tag number associates a request to one of the long or short queues. Generally, data retrieved from the DDR SDRAM O 202 is not in the same order as the receipt of the transmit cell requests, because the order of data retrieval is based on the optimized performance order. Out of order data is temporarily stored in the data buffer memory 211 of the read request control 208 to be reorganized based on the request index then sent out in a sequential order.

In an exemplary embodiment, a separate bank cell index is kept for every cell request of a bank. In one embodiment, if an index difference between top long and short cell requests of the FIFO buffers has been exceeded, the optimized performance order is suspended and a service of any stale cell requests is performed.

For each cell requested, the read request control circuit 208 reviews information related to that cell (e.g., FULL or EOF-RAG tag information) in the internal memory 213 of the SIC 212. In addition, the read request control circuit 208 reads cell data from the DDR SDRAM O 202 and sends the data to the POC SAR 214. The POC SAR 214 reassembles incoming cell data based on cell information, such as tag information and cell byte_count information. For example, if a FULL tag was set, the POC SAR 214 sends the cell data (minus some header information) to the aligner 216. In one embodiment, if a default FULL tag is cleared, the POC SAR 214 extracts the cell byte_count information from the last byte of a 64 byte cell and removes any unused bytes in the cell data before sending the cell data to the aligner 216. The aligner 216 re-aligns cell data into 64 byte cells to be sent out to the packet processor 102.

The foregoing examples illustrate certain exemplary embodiments of the invention from which other embodiments, variations, and modifications will be apparent to those skilled in the art. The invention should therefore not be limited to the particular embodiments discussed above, but rather is defined by the claims.

What is claimed is:

1. A device for managing packets in a data stream, comprising:
   a write request control unit operable to divide packets into a plurality of packet cells, the packet cells including one or more long cells and one or more short cells;
   an access control unit operable to store pointers to the long cells in a plurality of long cell queues and pointers to the short cells in a plurality of short cell queues during a write cycle, the write request control unit operable to selectively pair a long cell from any one of the long cell queues with a short cell from any one of the short cell queues during the write cycle, the access control unit operable to store a long cell and short cell pair into a memory in accordance with the pointers in the selected long cell queue and the selected short cell queue.

2. The device of claim 1, wherein the write request control unit selectively pairs a long cell with a short cell by maximizing transfer bandwidth efficiency in order to achieve an optimized performance order.

3. The device of claim 1, wherein the access control unit writes the packet cells into sequential banks of the memory.

4. A device for managing packets in a data stream, comprising:
- a write request control unit operable to divide a received packet into a plurality of packet cells, the packet cells including one or more long cells and one or more short cells, the write request control unit operable to selectively pair a long cell with a short cell;
- an access control unit operable to store pointers to the long cells in a long cell queue and pointers to the short cells in a short cell queue during a write cycle, the access control unit operable to store a long cell and short cell pair into a memory in accordance with the pointers in the long cell queue and the short cell queue;
- wherein the write request control unit selectively pairs a long cell with a short cell to achieve an optimized performance order;
- wherein the access control unit includes a write index for every long and short cell pointer, the access control unit operable to suspend the optimized performance order whenever a difference in the write index of top long and short cell pointers exceeds a predetermined threshold.

5. The device of claim 4, wherein the access control unit services pointers of stale cells in the long cell queue and the short cell queue when the difference in the write index of top long and short cell pointers has exceeded the predetermined threshold.

6. A device for managing packets in a data stream, comprising:
- a write request control unit operable to divide a received packet into a plurality of packet cells, the packet cells including one or more long cells and one or more short cells, the write request control unit operable to selectively pair a long cell with a short cell;
- an access control unit operable to store pointers to the long cells in a long cell queue and pointers to the short cells in a short cell queue during a write cycle, the access control unit operable to store a long cell and short cell pair into a memory in accordance with the pointers in the long cell queue and the short cell queue;
- a read request control unit operable to receive transmit cell requests during a read cycle, the read request control unit operable to provide a long request and a short request to the access control unit, the access control unit operable to store the long request in the long cell queue and the short request in the short cell queue.

7. The device of claim 6, wherein the read request control unit is operable to selectively pair a long request with a short request.

8. The device of claim 7, wherein the read request control unit selectively pairs a long request with a short request to achieve an optimized performance order.

9. The device of claim 8, wherein the access control unit includes a request index for every long and short request, the access control unit operable to suspend the optimized performance order whenever a difference in the read index of top long and short requests exceeds a predetermined threshold.

10. The device of claim 9, wherein the access control unit services pointers of stale requests in the long cell queue and the short cell queue when the difference in the write index of top long and short requests has exceeded the predetermined threshold.

11. A method for managing packets in a data stream, comprising:
- dividing packets into one or more packet cells, the packet cells including one or more long cells and one or more short cells;
- storing pointers to the long cells in a plurality of long cell queues during a write cycle;
- storing pointers to the short cells in a plurality of short cell queues during the write cycle;
- selectively pair a long cell from one of the long cell queues with a short cell from one of the short cell queues during the write cycle;
- storing the long and short cell pair into a memory in accordance with the pointers in the selected long cell queue and the selected short cell queue.

12. The method of claim 11, wherein the long and short cell pair is stored in sequential banks of the memory.

13. A method for managing packets in a data stream, comprising:
- dividing a packet into one or more packet cells, the packet cells including one or more long cells and one or more short cells;
- selectively pairing a long cell with a short cell;
- storing pointers to the long cells in a long cell queue during a write cycle;
- storing pointers to the short cells in a short cell queue during the write cycle;
- storing the long and short cell pair into a memory in accordance with the pointers in the long cell queue and the short cell queue;
- establishing an optimized performance order for the long cell and the short cell;
- determining whether the optimized performance order is to be suspended;
- processing stale long and short cell pointers in response to the optimized performance order being suspended.

14. A method for managing packets in a data stream, comprising:
- dividing a packet into one or more packet cells, the packet cells including one or more long cells and one or more short cells;
- selectively pairing a long cell with a short cell;
- storing pointers to the long cells in a long cell queue during a write cycle;
- storing pointers to the short cells in a short cell queue during the write cycle;
- storing the long and short cell pair into a memory in accordance with the pointers in the long cell queue and the short cell queue;
- receiving transmit cell requests during a read cycle, the transmit cell requests including one or more long requests and one or more short requests;
- selectively pairing a long request with a short request;
- storing the long and short request pair in the long cell queue and the short cell queue;
- retrieving the long and short cell pair from the memory in accordance with the long and short request pair in the long cell queue and the short cell queue.

15. The method of claim 14, further comprising:
- establishing an optimized performance order for the long request and the short request;
- determining whether the optimized performance order is to be suspended;
- processing stale long and short requests in response to the optimized performance order being suspended.

16. A system for managing packets in a data stream, comprising:
- a packet manager operable to divide packets into a plurality of packet cells, the packet cells including one or more long cells and one or more short cells, the packet manager operable to store pointers to the long cells in a plurality of long cell queues and pointers to the short cells in a plurality of short cell queues during a write cycle, the packet manager operable to selectively pair a long cell from any one of the long cell queues with a short cell from any one of the short cell queues during the write cycle, the packet manager operable to store a long cell and short cell pair in accordance with the pointers in the selected long cell queue and the selected short cell queue.

17. The system of claim 16, further comprising:
a packet scheduler operable to receive packet identification information from the packet manager, the packet scheduler operable to generate instructions to schedule transmission of the packet for the packet manager.

18. The system of claim 17, wherein the instructions generated by the packet scheduler include dropping the packet as a result of congestion.

19. The system of claim 18, wherein the packet manager is operable to transmit the packet at the time slot designation in accordance with the instructions generated by the packet scheduler.

20. The system of claim 17, wherein the packet scheduler is operable to modify the packet identification information to include a time slot designation for transmission of the packet.

* * * * *